United States Patent
Losange

(10) Patent No.: US 10,421,644 B2
(45) Date of Patent: Sep. 24, 2019

(54) PIVOTING LIFTING RING FOR LIFTING LOADS

(71) Applicant: INTELPROP S.A., Wiltz (LU)

(72) Inventor: Christophe Losange, Sibret (BE)

(73) Assignee: INTELPROP S.A., Wiltz (LU)

( * ) Notice: Subject to any disclaimer, the term of this patent is extended or adjusted under 35 U.S.C. 154(b) by 0 days.

(21) Appl. No.: 16/070,877

(22) PCT Filed: Jan. 19, 2017

(86) PCT No.: PCT/EP2017/051080
§ 371 (c)(1),
(2) Date: Jul. 18, 2018

(87) PCT Pub. No.: WO2017/125492
PCT Pub. Date: Jul. 27, 2017

(65) Prior Publication Data
US 2019/0016567 A1    Jan. 17, 2019

(30) Foreign Application Priority Data

Jan. 20, 2016 (LU) .......................... 92951

(51) Int. Cl.
*B66C 1/66* (2006.01)
*B33Y 80/00* (2015.01)
(Continued)

(52) U.S. Cl.
CPC ............... *B66C 1/66* (2013.01); *B33Y 80/00* (2014.12); *B22F 3/1055* (2013.01); *B22F 5/10* (2013.01); *B22F 5/106* (2013.01); *Y02P 10/295* (2015.11)

(58) Field of Classification Search
CPC ......... B33Y 80/00; B66C 1/66; B22F 3/1055; B22F 5/10; B22F 5/106; Y02P 10/295
See application file for complete search history.

(56) References Cited

U.S. PATENT DOCUMENTS 8,201,867 B2 * 6/2012 Thomeczek ............. B66C 1/66
                                                         294/215
8,464,414 B2 * 6/2013 Gutierrez .................. B66C 1/12
                                                         254/264
(Continued)

FOREIGN PATENT DOCUMENTS

CN    102864393 A    1/2013
EP      1069067 A1   1/2001
(Continued)

OTHER PUBLICATIONS

Written Opinion dated Mar. 27, 2017 of corresponding International Application No. PCT/EP2017/051080; 12 pgs.
(Continued)

*Primary Examiner* — Stephen A Vu
(74) *Attorney, Agent, or Firm* — Maier & Maier, PLLC

(57) ABSTRACT

A lifting point for lifting loads having a swivel body with which is associated an attaching loop capable of cooperating with a lifting accessory, and a fixing member for fixing said lifting point to a load, the fixing member and the swivel body being joined together by a swivel linkage allowing the body to swivel relative to the fixing member about an axis. The parts of the fixing member and of the swivel body cooperating in the swivel linkage are each made in one piece, so as to form a linkage which cannot be dismantled, one and/or the other of these parts being manufactured by metallic additive manufacturing.

10 Claims, 2 Drawing Sheets

(51) Int. Cl.
*B22F 3/105* (2006.01)
*B22F 5/10* (2006.01)

(56) References Cited

U.S. PATENT DOCUMENTS

| | | | | |
|---|---|---|---|---|
| 8,544,924 | B2* | 10/2013 | Inda | B66C 1/108 |
| | | | | 294/215 |
| 8,602,705 | B2* | 12/2013 | Chen | F16B 35/06 |
| | | | | 411/371.2 |
| 8,622,675 | B2* | 1/2014 | Chen | F16B 35/06 |
| | | | | 411/371.2 |
| 2004/0032134 | A1 | 2/2004 | Hageman | |

FOREIGN PATENT DOCUMENTS

| | | |
|---|---|---|
| EP | 2361870 A1 | 8/2011 |
| JP | S52-85279 U | 6/1977 |
| JP | S61-133303 A | 6/1986 |
| JP | S62-194679 U | 12/1987 |
| JP | H05-149316 A | 6/1993 |
| JP | H05-306091 A | 11/1993 |
| JP | H08-13005 A | 1/1996 |
| JP | H09-169486 A | 6/1997 |
| JP | H11-139754 A | 5/1999 |
| JP | 03/055785 A1 | 7/2003 |
| JP | 2005-513384 A | 5/2005 |
| WO | 90/10803 A1 | 9/1990 |
| WO | 2015/051916 A1 | 4/2015 |

OTHER PUBLICATIONS

International Search Report with English translation and Written Opinion dated Mar. 27, 2017 of corresponding International Application No. PCT/EP2017/051080; 12 pgs.

Japanese Office Action dated Dec. 4, 2018, in connection with corresponding JP Application No. 2018-538728 (8 pgs., including English translation).

Office Action dated Feb. 14, 2019 in corresponding Korean Application No. 10-2018-7023887; 9 pages.

* cited by examiner

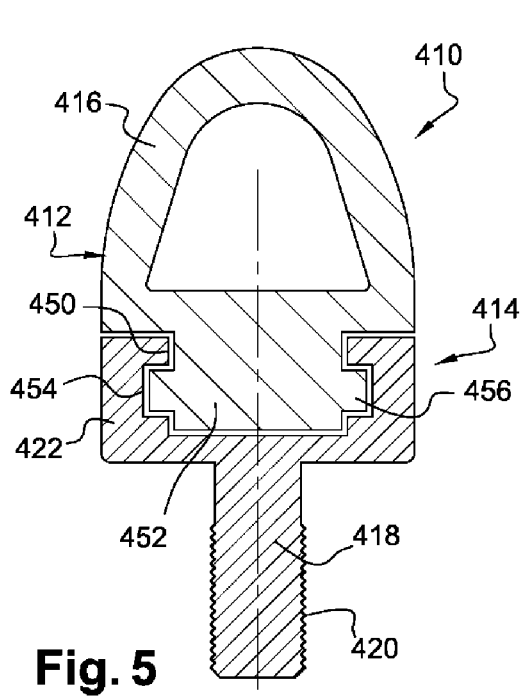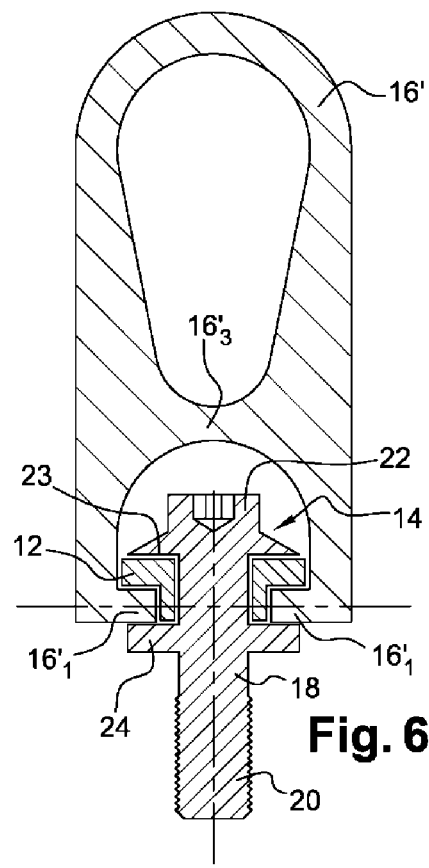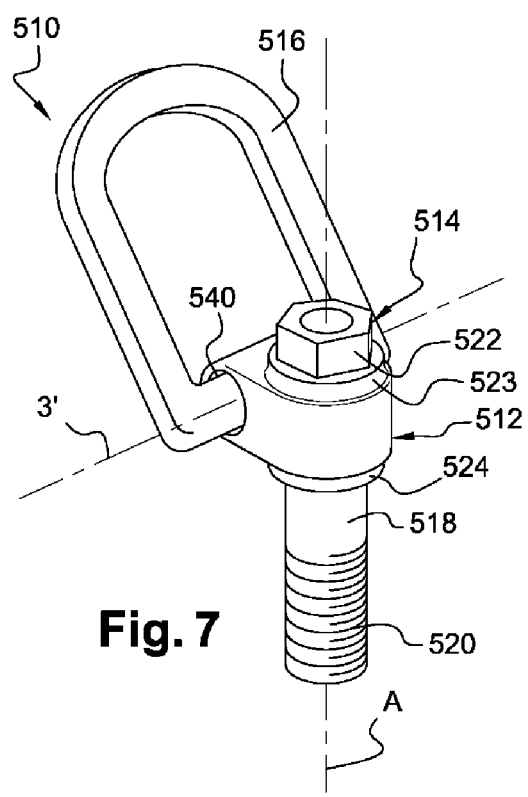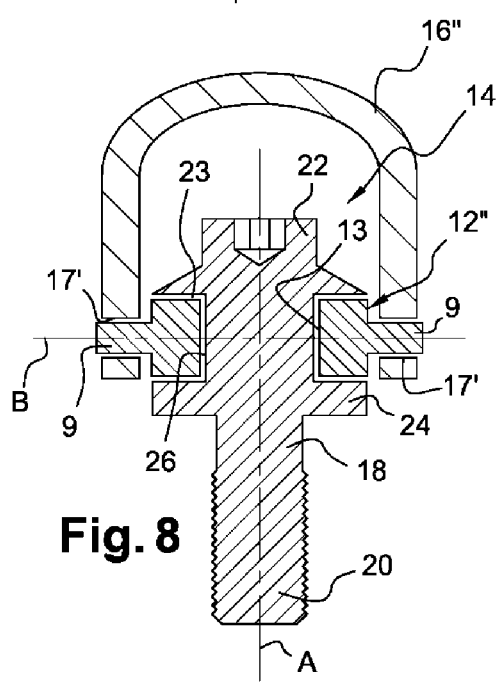

PIVOTING LIFTING RING FOR LIFTING LOADS

FIELD

The present invention relates to a device for lifting loads generally known as a swivel lifting point or lifting eye. Swivel eyes are used in all instances where it may be useful or necessary to allow orientation of the eye relative to the load being handled by swivelling the eye about a fixed axis determined when the eye is fixed to the load, this fixed axis being generally orthogonal to the surface of the part to which the eye is fixed.

BACKGROUND

Such swivel eyes are used in particular in instances where use is made of a plurality of eyes fixed to the load and where these eyes are connected to a single lifting member (e.g. a hook) by slings or chains. In such a case, the direction of the lifting slings or chains is inclined relative to the axis of the fixing member, and it is important that the plane of the annular part is oriented in the direction in which the pull force is applied to the eye, to prevent excessive forces across the plane of the eye and also to prevent any risk of excessive tightening, and above all loosening, of the fixing screw. Orientation of the eye must therefore be able to adapt to this lifting force direction, without the need for swivelling of the fixing screw, or without the application of a tightening or loosening torque thereto.

Typically, a lifting eye comprises a swivel body joined to a fixing member by a swivel linkage, and an attaching loop integral with the swivel body and generally hinged.

One major objective for manufacturers of lifting eyes is to guarantee user safety, primarily by the dimensions of the eyes, the choice of materials and the manner of manufacture. However, guaranteeing safety also involves guaranteeing eye integrity.

One drawback of known lifting eyes lies in their dismantlability. This is because one or more essential elements of an eye, in particular at the level of the swivel linkage, may be dismantled and, without this being apparent to the user, replaced by unsuitable elements or elements of lower quality. The user of a lifting eye of this type will therefore always be concerned that the eye may have been modified, without his or her knowledge, in such a way as to reduce the performance levels quoted by the manufacturer, so diminishing safety.

In this context, certain manufacturers have taken measures to limit the possibility of dismantling the eye.

EP1069067 and EP2361870 for example describe swivel eyes typically comprising a swivel element generally annular in shape, known as an attaching ring or loop, mounted on a body in which a bore is formed, and a screw fixing member extending into the bore. The screw fixing member comprises a head serving as a stop for the body and a threaded or tapped part for allowing fixing thereof by screwing into a tapped hole or onto a threaded shank integral with the load to be lifted. The lifting slings or chains may be connected to the swivel loop by insertion therein of a hook, shackle, carabiner etc.

In the eye of EP1069067, the swivel body is attached to a fixing bolt, and held between the bolt head and a flanged bushing fixed to the bolt. For increased safety, the flanged bushing is shrunk onto the bolt shank.

In the eye of EP2361870, the fixing member extends into a bore in the eye body and cooperates with a bushing and an anti-loosening washer.

SUMMARY

The object of the present invention is to propose a lifting point ensuring a high level of safety.

The present invention relates to a lifting point for lifting loads, comprising:

a swivel body with which is associated a coupling means capable of cooperating with a lifting accessory;

a fixing member for fixing the eye to the load, the fixing member and the swivel body being joined together by a swivel linkage allowing the body to swivel relative to the fixing member about an axis A.

According to the invention, the parts of the fixing member and of the swivel body cooperating in the swivel linkage are made in one piece, and one and/or the other of these parts is/are manufactured by metallic additive manufacturing, so as to form a swivel linkage that cannot be dismantled.

The swivel linkage may be made in various ways, typically involving complementary nested shapes (shape matching). In general, one of the parts cooperating in the swivel linkage forms an annular groove, and the other part is received in the groove. In particular, the cooperating parts of the fixing member and of the swivel body form at least one annular tongue and groove assembly.

Additive manufacturing technology (also known as 3D printing) indeed allows the production of mechanical shapes nested inside one another. It may be noted that the invention makes use of metallic additive manufacturing to produce a swivel linkage which cannot be dismantled between the fixing member and the swivel body. In this way, a novel eye structure is obtained, in which the fixing member and the swivel body may be formed in one piece with the parts cooperating in the swivel linkage, making it impossible to dismantle the swivel body.

The expression "formed in one piece" is used in the context of the present application in its conventional sense, to designate a monobloc part, manufactured in a single piece, typically by moulding, forging, or the like, including additive manufacture. The term "swivel linkage" also denotes, as is conventional, a joint allowing rotational guidance about an axis (substantially without sliding, apart from functional clearance).

For increased safety, the fixing member and the swivel body are advantageously manufactured in one piece, with the respective parts cooperating in the swivel linkage.

This swivel linkage principle may be achieved in practice in various ways:

According to one variant design, the fixing member passes through the body and comprises a shank portion with two external radial protrusions, thereby defining a groove which receives a corresponding part of the swivel body, so as to allow the swivel body to rotate about the fixing member but ensuring axial locking thereof. The part of the swivel body engaged in the groove may be more or less substantial, for example the entire thickness of the body, or alternatively simply an internal radial tongue. Alternatively, the fixing member comprises a shank portion with an external annular protrusion, which is accommodated in an annular groove provided in a through-bore in the body.

According to another variant design, the fixing member does not pass through the body and the swivel linkage is formed between the head of the fixing member and the body.

BRIEF DESCRIPTION OF THE DRAWINGS

Other distinctive features and characteristics of the invention will be revealed by the detailed description of some advantageous embodiments given below by way of example, with reference to the appended drawings, in which:

FIG. 5 is a schematic sectional view of 7 variants of the present lifting point;

FIG. 6 is a schematic sectional view of 7 variants of the present lifting point;

FIG. 7 is a perspective view of another variant of the present lifting point; and FIG. 8 is a schematic sectional view of 7 variants of the present lifting point.

DETAILED DESCRIPTION

Figure 1:
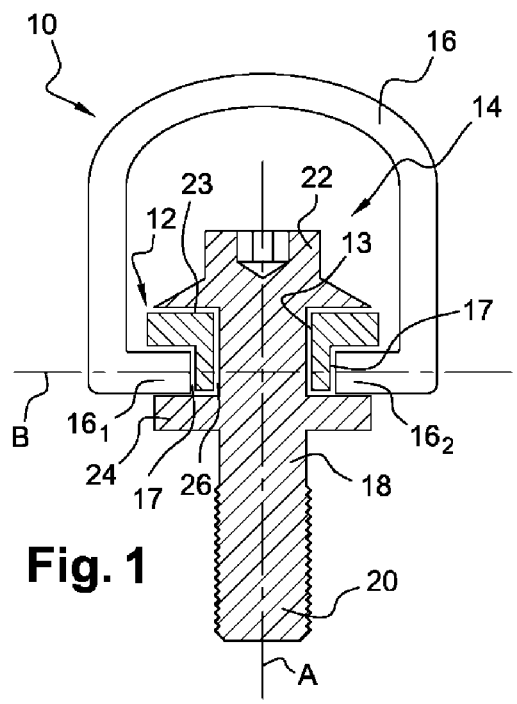
FIG. 1 is a schematic sectional view of 7 variants of the present lifting point.

A first variant embodiment of the lifting point 10 is illustrated in FIG. 1. It comprises a monobloc swivel body 12 and a fixing member 14 joined together by a swivel linkage so as to allow these two parts to swivel relative to one another. Reference sign 16 denotes a coupling means associated with the swivel body 12 which is capable of cooperating with a lifting accessory (not shown). The coupling means 16 here takes the form of a rounded stirrup mounted hingedly to the swivel body 12 and constituting the attaching loop of the lifting point 10.

The fixing member 14 allows the lifting point 10 to be fixed to a load to be lifted and permits swivelling of the body 12 around the fixing member 14 about an axis A.

The lifting point 10 of FIG. 1 therefore constitutes a double-articulated lifting eye, the body 12 being able to swivel about axis A around the fixing member and the loop 16 being able to swivel on the body 12 about a perpendicular axis B. In use, the attaching loop 16 allows a lifting accessory, such as a hook, a rope, a chain, a sling, an intermediate link etc., to be fastened on.

It may be noted that the body 12 and the fixing member 14 are joined together by the swivel linkage in such a way as to be impossible to dismantle.

The swivel body 12, which may have the general shape of a disc, a parallelepiped or the like, comprises a through-bore 13 (or passage) through which the fixing member 14 passes. In the variant, the body 12 has the initial shape of a disc and, with the bore 13, therefore takes the form of a thick ring or sleeve.

The fixing member 14 is of the screw type and comprises a shank 18 having a threaded end 20 and bearing at the other end a screw head 22 with shoulders. The shank 18 further comprises a radial rib or protrusion 24 on its outer face.

The screw head 22 with its part 23 with shoulders and the protrusion 24 thus constitute two radial stops which define a groove 26 for receiving the body 12. The fixing member 14 therefore passes through the bore 13 in the body 12. The body 12 is able to turn freely around the screw member 14 and is locked axially (except for functional clearance) by the stops formed by the head 22 and tongue 24.

It may be noted that the fixing member 14 and the body 12 are each made in one piece, which means that the eye cannot be dismantled. To achieve this, the body and/or the fixing member are produced by metallic additive manufacturing.

Metallic additive manufacturing methods are currently at a stage of development which allows industrial production. It is possible to manufacture the eyes shown in the figures of metallic materials (for example steel) with a mechanical strength appropriate to lifting eyes. They may be manufactured, for example, on an Arcam EBM (Electron Beam Melting) machine, sold by Arcam AB of Molndal, Sweden. This machine is mentioned merely by way of example. A person skilled in the art may select any suitable machine.

For simplified implementation, the fixing member and the body can be manufactured in a single 3D manufacturing operation.

Alternatively, it is possible to manufacture one of the parts of the swivel linkage using a traditional method, for example forging (or moulding) and machining, and then to manufacture the other part by 3D printing around, or within, the first. It would, for example, be possible to place a fixing member manufactured by conventional forging/machining in the additive manufacturing machine to form the body (outer part) around the fixing member by 3D printing.

As for the attaching loop 16, this may be manufactured by any suitable method, thus by 3D printing or by conventional methods, in particular by forging. The choice between 3D printing or conventional methods depends on the configuration. In the variant of FIG. 1, the attaching loop 16 is generally U-shaped, with the ends of the branches 16$_1$ terminating in coaxial journals 16$_2$ which extend towards one another from said branches 16$_1$ and which are engaged in receptacles acting as swivel bearings for the loop 16. This loop 16, which is simple in shape, may be made by forging and introduced into the receptacles after manufacture of the body 12 and screw 14 assembly.

The receptacles are formed by two diametrically opposed recesses 17, provided in the body 14 at the end thereof adjoining the annular protrusion 24. The recesses are open towards the annular protrusion 24. The journals 16$_1$, 16$_2$ are therefore held in the open recesses by the annular protrusion 24.

The recess could however take the form of a blind hole in the median region of the body.

Of course, the diameter of the bore 13 in the body 14 and the diameter of the shank 18 at the level of the groove 26, together with the distance between the shoulder 23 and the protrusion 24, are such that functional axial and radial clearance is present, allowing the body 14 to turn freely on the shank 18. However, the radial extent of the stops 23 and 24 is also sufficiently greater than the functional clearances to ensure the swivel linkage cannot be forcibly dismantled. In practice, the shoulder 23 of the head 22 and the protrusion 24 may extend radially approximately as far as the periphery of the body 12.

It is also apparent here that the protrusion 24 serves equally well in forming a guide stop as it does as a surface bearing against the load, without thereby affecting rotation of the body 12 after tightening.

It is clear to a person skilled in the art that other configurations of the body and of the hinged/swivel mounting of the stirrup/loop thereon may be envisaged.

In particular, as illustrated in the variant of FIG. 8, the body 12" could have two diametrically opposed journals 9, and the U-shaped stirrup 16" could then simply have bores 17' (ears) at the ends of its branches forming a bearing around said journals 9.

The shape of the loop may also vary. FIG. 6 shows a variant in which the body 12 and screw 14 assembly is identical to FIG. 1, and is distinguished by a loop 16' comprising a cross-piece 16'$_3$. Such a loop shape cannot be mounted after manufacture of the body 12 and screw 14 assembly, and will therefore be 3D-manufactured therewith, or prefabricated and placed into the 3D machine.

Figure 2:
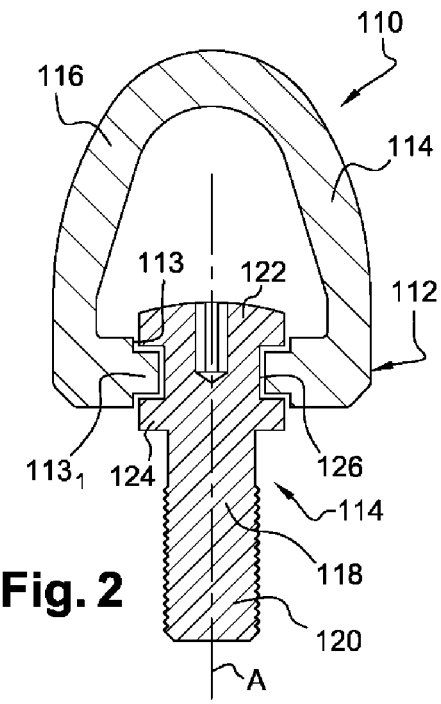
FIG. 2 is a schematic sectional view of 7 variants of the present lifting point.

Another variant embodiment is shown in FIG. 2. The lifting point 110 has a monobloc body 112, which comprises an attaching loop 114 (generally annular in shape) rigidly integral with the body 112, preferably formed in one piece with the body 112.

The swivel linkage comprises a central passage 113, through which passes the screw fixing member 114. The fixing member 114 comprises a shank 118 with an annular groove 126 defined by two radial wings. The first wing is formed by the screw head 122 with shoulders and the second by an annular protrusion 124. For screwing purposes, the screw head 122 here comprises a hexagonal blind hole, but it would of course be possible for it to have a raised hexagonal shape, or any other shape suitable for screwing.

The passage 113 has a stepped profile: it comprises an annular rib 1131 (or tongue) which engages in the groove 126 in the shank 118.

The body 112 with loop 116 and the fixing member 114 are integral parts, which are produced by metallic additive manufacturing.

The swivel linkage, which allows swivelling of the body about the axis A, cannot therefore be dismantled.

Figure 3:
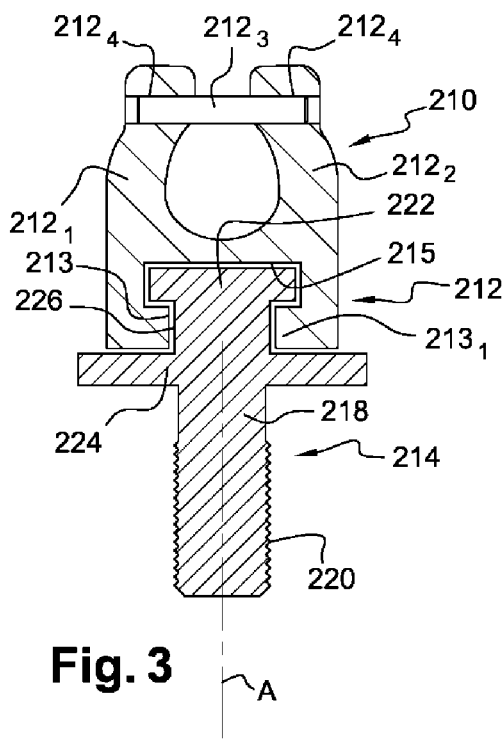
FIG. 3 is a schematic sectional view of 7 variants of the present lifting point.

FIG. 3 proposes a lifting point variant 210 in which the shape of the coupling means is not a conventional loop shape. The monobloc body 212 comprises two side arms 212$_1$ and 212$_2$ extending substantially in the direction of axis A. The ends of the arms are perforated. A transverse rod 212$_3$ is passed through the end orifices 212$_4$ in the arms and fixed there, so as to close the passage between the arms.

For the swivel linkage, the fixing member 214 comprises a shank 218 with a mushroom-type head 222 accommodated in the body 212 and a threaded end 220. The shank 218 passes through a passage 213 formed in the lower face of the body 212, which leads to an internal blind chamber 215, in which is located the head 222 of the fixing member 14. Since the diameter of the head 222 is larger than the diameter of the passage 213, the screw head is locked in the chamber by shape matching. However, the between the parts 212 and 214 are such that the body 212 may swivel around the fixing member 214 about axis A.

The shank 218 bears a radial protrusion 224 which forms a radial stop defining a swivel groove 226 with the shoulder of the head 222. The radial protrusion 226 defines an axial stop which provides the body 212 with functional clearance when it is screwed onto the load to be lifted. To allow screwing of the lifting point 210, the protrusion 224 extends radially beyond the body 212 and has a hexagonal peripheral shape, or other suitable shape, allowing engagement by a screwing/tightening tool.

Figure 4:
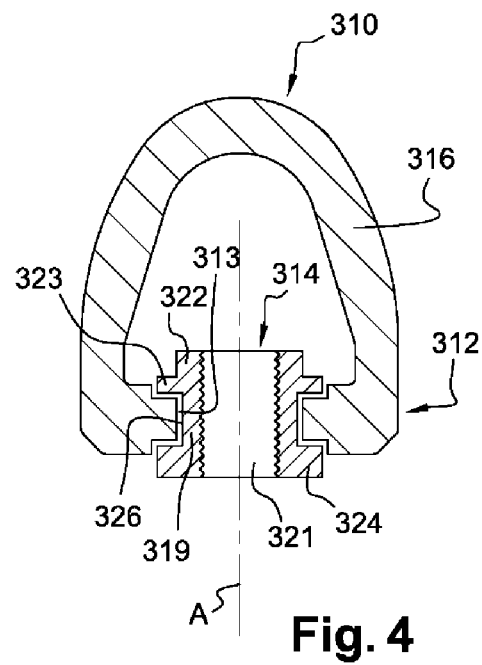
FIG. 4 is a schematic sectional view of 7 variants of the present lifting point.

In the variant of FIG. 4, the lifting point 310 again comprises a body 312 comprising an attaching loop 316 (generally annular in shape) rigidly integral with the body 312 and formed in one piece therewith. The body comprises a bore 313 defining a passage for a fixing member 314, joined together by a swivel linkage, in an embodiment similar to FIG. 2.

Here too, the fixing member 314 is of the screw type, but female. It comprises a tubular segment 319 bearing two wings defining a radial groove 326. The screw head 322 defines a first wing 323. The second wing 324 is a radial protrusion. The body 312 is thus engaged, at the level of the passage 313, in the groove 326.

The external diameter of the tube 319, the internal diameter of the passage 313, together with the distance between the two wings 322 and 324, are such that functional axial and radial clearance is present, allowing the body 312 to turn freely on the tubular segment 319.

The internal passage 321 of the tubular segment 319 is at least partly tapped, to allow the eye to be fixed by screwing to a threaded shank integral with the load to be lifted. The head 322 has a hexagonal peripheral shape, or other suitable shape, allowing engagement thereof by a screwing/tightening tool.

Yet another variant is shown in FIG. 5. The eye 410 comprises a monobloc body 412 with an attaching loop 416 rigidly integral with the body 412. The body 412 is joined by a swivel linkage to a screw fixing member 414.

The monobloc fixing member 414 comprises a threaded shank 418 with a head 422 dimensioned to receive, in a blind hole 450, a cylindrical part 452 of the body 412. In particular, the blind hole 450 formed in the head 422, on the opposite side from the threaded shank part 420, comprises an annular groove 454. The cylindrical part 452, engaged in the hole 450, bears an annular tongue 456 extending radially into the groove 454.

The fixing member 414 and the body 412 are produced by metallic additive manufacturing, and so the swivel linkage cannot be dismantled.

The head 422 has a hexagonal peripheral shape, or other suitable shape, allowing engagement thereof by a screwing/tightening tool.

A final variant is shown in FIG. 7. The lifting eye 510 comprises a body 512 and a screw fixing member 514. A swivel linkage which cannot be dismantled allows rotation relative to axis A of the body 512 with respect to the fixing member 514. A lifting loop 516 is mounted hingedly on the body 512 and may swivel about an axis B' perpendicular to axis A but offset laterally relative thereto (in contrast to the variant of FIG. 6 where axis B crosses axis A).

The body 512 is a monobloc part comprising a through-bore for the screw fixing member 514. The fixing member 514 comprises a shank 518 with a head 522, the lower part of which forms a collar 523, and a radial protrusion 524. The collar 523 and the stop 524 form two axially spaced radial stops which define an annular groove in which the body 512 is engaged for rotation about axis A. The swivel linkage is therefore produced in the same way as in FIG. 2.

The loop 516 is an annular body, one part of which engages in a through-bore 540 in the body 512, extending transversely of axis A and offset relative thereto, to allow the loop to swivel about B'. The loop 516 may be partially open (similar to the loop 16 of FIG. 1) or completely closed, which is not a problem within the context of 3D manufacture.

As will be understood in the light of the above variants, the invention presents a lifting point which cannot be dismantled, in that the parts of the fixing member and of the body cooperating in the swivel linkage are produced in one piece. In particular, the fixing member and the body are each manufactured in one piece, which is made possible by the use of metallic additive manufacturing.

Depending on the additive manufacturing technology used, the order of manufacture may be modified. It is possible, for example, to envisage:

manufacture of the eye assembly, that is to say body, fixing member and attaching loop, using metallic 3D printing;

manufacture of the body/fixing member assembly by metallic 3D printing and subsequent addition of the forged loop, if the loop shape allows it;

prefabrication of the body or of the fixing member using conventional methods, and additive manufacture of the other part around the prefabricated part.

The invention claimed is:

1. A lifting point for lifting loads, comprising:
a swivel body with which is associated a coupling means capable of cooperating with a lifting accessory;
a fixing member for fixing the lifting point to the load, the fixing member and the swivel body being joined together by a swivel linkage allowing the swivel body to swivel relative to the fixing member about an axis of rotation (A);
wherein the fixing member is of a screw type and extends into a bore in the swivel body, thereby defining the axis of rotation (A), and
wherein the parts of the fixing member and of the swivel body cooperating in the swivel linkage are each made in one piece, and one and/or the other of the fixing member and the swivel body is/are manufactured by metallic additive manufacturing.

2. The lifting point according to claim 1, wherein the parts of the fixing member and of the swivel body cooperating in the swivel linkage form at least one annular tongue and groove assembly.

3. The lifting point according to claim 2, wherein the swivel body and the fixing member, with the annular tongue and groove assembly, are respectively made in one piece.

4. The lifting point according to claim 1, wherein one of the parts of the fixing member and of the swivel body cooperating in the swivel linkage forms an annular groove, and the other part of the parts of fixing member and of the swivel body cooperating in the swivel linkage is received in the annular groove.

5. The lifting point according to claim 1, wherein
the fixing member comprises a shank having a head with shoulders and a threaded end, as well as an annular protrusion defining, with the head with shoulders, an annular groove, the head with shoulders and the annular protrusion being made in one piece with the shank; and
the swivel body is engaged in this annular groove so as to swivel around the fixing member, while being limited axially by the head and the annular protrusion.

6. The lifting point according to claim 1, wherein
the fixing member comprises a hollow cylindrical body passing through the bore in the swivel body and bearing two external radial protrusions forming a groove in which the swivel body is engaged so as to swivel about the hollow cylindrical body; and
the internal passage of the cylindrical body is at least partly threaded for fixing thereof on a threaded shank integral with the load.

7. The lifting point according to claim 1, wherein the coupling means is a loop hinged on the swivel body or a loop in one piece with the swivel body.

8. The lifting point according to claim 7, wherein the coupling means is a loop engaged in a through-bore in the swivel body, extending along an axis of rotation (B) transverse to the axis of rotation (A) of the swivel body and offset laterally relative thereto.

9. The lifting point according to claim 1, wherein the coupling means is a loop hinged on the swivel body and wherein the loop is hinged to the swivel body so as to swivel about an axis of rotation (B) substantially perpendicular to the axis of rotation (A) and passing through the fixing member.

10. A lifting point for lifting loads, comprising:
a swivel body with which is associated a coupling means capable of cooperating with a lifting accessory;
a fixing member for fixing the lifting point to the load, the fixing member and the swivel body being joined together by a swivel linkage allowing the swivel body to swivel relative to the fixing member about an axis of rotation (A); wherein
the parts of the fixing member and of the swivel body cooperating in the swivel linkage are each made in one piece, and one and/or the other of the fixing member and the swivel body is/are manufactured by metallic additive manufacturing;
the fixing member comprises a widened head accommodated in a blind hole in the swivel body, the blind hole comprising a narrow entry passage engaging in a groove formed between the widened head and a radial protrusion located on the fixing member, outside the swivel body; and
the radial protrusion located on the fixing member has a peripheral shape which allows engagement thereof by a screwing/tightening tool.

* * * * *